May 23, 1967 G. V. WATTS 3,321,039
AIR CUSHION BORNE VEHICLES WITH HOLLOW INFLATABLE SKIRTS
Filed July 21, 1964 2 Sheets-Sheet 1
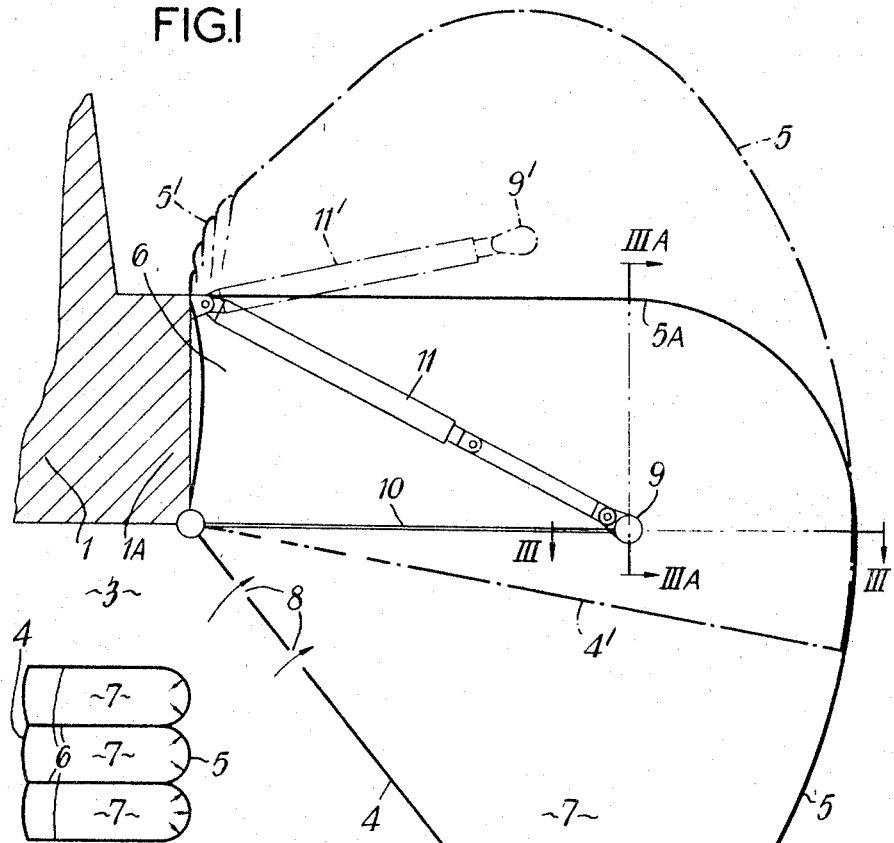
FIG.1
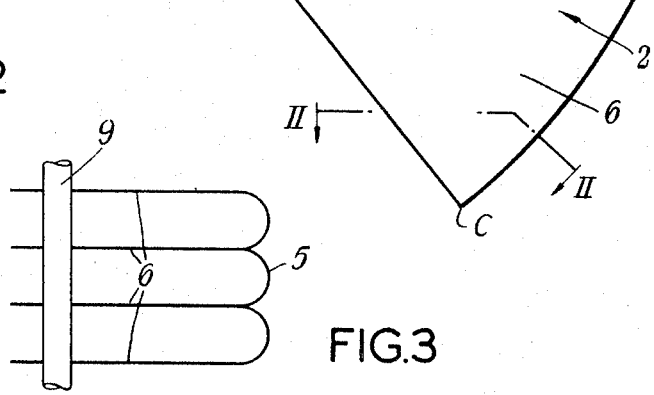
FIG.2
FIG.3
Inventor
Gordon Victor Watts May 23, 1967  G. V. WATTS  3,321,039
AIR CUSHION BORNE VEHICLES WITH HOLLOW INFLATABLE SKIRTS
Filed July 21, 1964  2 Sheets-Sheet 2

United States Patent Office 3,321,039
Patented May 23, 1967

3,321,039
AIR CUSHION BORNE VEHICLES WITH HOLLOW INFLATABLE SKIRTS
Gordon Victor Watts, Swindon, England, assignor to Vickers-Armstrongs (Engineers) Limited, London, England, a British company
Filed July 21, 1964, Ser. No. 384,089
Claims priority, application Great Britain, July 23, 1963, 29,210/63
8 Claims. (Cl. 180—7)

This invention relates to air cushion borne vehicles.

According to the present invention there is provided a vehicle having a vehicle body that is arranged for receiving support from an air cushion when formed in a space beneath the vehicle body, the vehicle being provided with a flexible skirt for depending from the periphery of the vehicle body to minimise leakage of air laterally from said space, the skirt being of hollow inflatable form and adapted so that when inflated it projects laterally from the periphery of the vehicle body to form a fender, and there being means provided on the vehicle for effecting the retraction or lifting and lowering of the skirt at will so that the bottom of the skirt can be raised and lowered relative to the vehicle body, the skirt having a bottom portion tied to the bottom edge of the vehicle body, so that during such raising and lowering the bottom of the skirt rotates about the bottom edge of the body, whereby, upon retraction of the skirt, the bottom of the skirt moves clear of the vehicle body.

Figure 4:
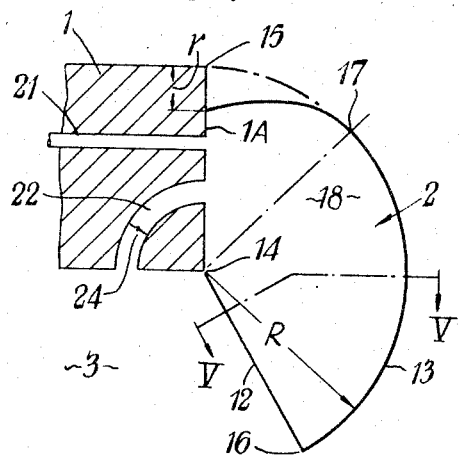
Figure 6:
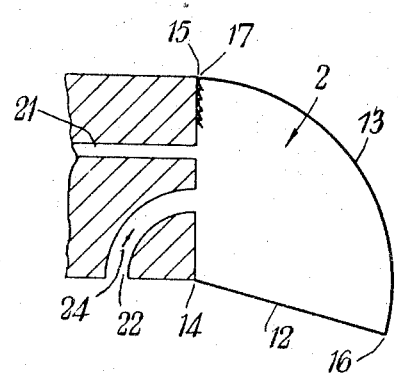
Figure 5:
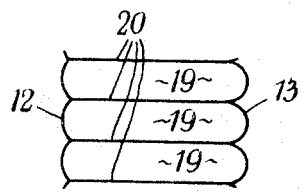
Figure 8:
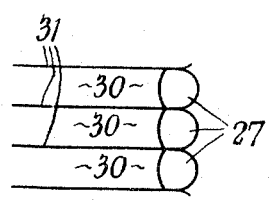
Figure 7:
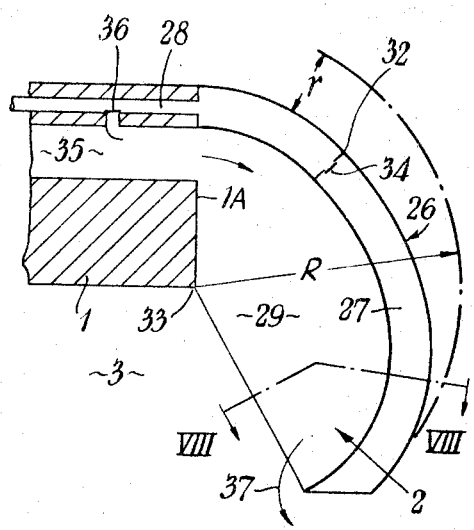

For a better understanding of the invention and to show how the same may be carried into effect reference will now be made, by way of example, to the accompanying drawings, in which:

FIGURE 1 is a diagrammatic sectional elevation of part of an air cushion borne vehicle, FIGURE 2 is a section on II—II of FIGURE 1, FIGURE 3 is a section on III—III or IIIA—IIIA of FIGURE 1, the views on these two section lines being identical, FIGURE 4 is a diagrammatic sectional elevation of a portion of another air cusion borne vehicle, FIGURE 5 is a section on V—V of FIGURE 4, FIGURE 6 is a view similar to FIGURE 4 but showing the parts in a different position, FIGURE 7 is a diagrammatic sectional elevation of part of a further form of air cushion borne vehicle, and FIGURE 8 is a section on VIII—VIII of FIGURE 7.

The vehicle of FIGURES 1 to 3 has a body 1 to the peripheral part 1A of which a retractable flexible inflatable skirt 2 is attached for depending from the body 1 to encircle (when in its inflated and lowered position as shown in full lines in the drawings) the space 3 below the body 1. The space 3 is arranged to be supplied with air by a compressor (not shown) on the vehicle to form an air cushion in the space 3 for supporting the vehicle, the skirt 2 minimising escape of air laterally from the space 3.

The skirt 2 has an inner wall 4 and an outer wall 5 each made of thin flexible sheet material of rubber or similarly flexible material. The inner and outer walls 4 and 5 are joined together at the bottom of the skirt 2. With the skirt 2 in the lowered position shown in the drawing the inner wall 4 extends from the bottom thereof inwardly and upwardly and is attached to the lower edge of the peripheral part 1A. The outer wall 5 bulges outwardly. It extends from the bottom thereof at first upwardly and outwardly and then upwardly and inwardly, and finally horizontally, the top edge of the outer wall 5 being joined to the upper edge of the peripheral part 1A. The outer wall 5 in sections perpendicular to the plane of the drawing is corrugated with the fold lines of the corrugations running from the bottom of the wall 5 upwardly to the top thereof and then horizontally along the top of the wall 5. Each fold line of the wall 5 is joined to the wall 4 by a vertical web 6, the webs 6 dividing the interior of the hollow skirt 2 into a plurality of compartments 7. The webs 6 may also be joined to the part 1A. Each web 6 is of thin flexible sheet material of rubber or similarly flexible material. Each compartment 7 communicates with the space 3 via the vents 8.

A horizontal boom 9 is provided in association with each lateral side of the body 1 and extends parallel to the associated side passing through the webs 6 of the part of the skirt 2 that is along this side of the vehicle. The boom 9 is connected to the lower edge of the peripheral part 1A by a member 10, the member 10 being pivotally connected, about a horizontal axis, to the part 1A. Jacks 11 connect each boom 9 to the upper edge of the part 1A, one end of each jack being pivotally secured to the boom 9 and the opposite end being pivotally secured to the part 1A, the axes of the pivotal connections at the opposite ends of each jack being horizontal.

When the vehicel is supported on the air cusion, the letter being encircled by the skirt 2, the parts take up the position shown in full lines in FIGURE 1. Air is supplied to the space 3 by said compressor to form said cushion and the skirt 2 is inflated by air flowing into the compartments 7 from the space 3 via the vents 8. The jacks 11 are in their extended condition. It will be understood that as the wall 4 extends outwardly as it proceeds downwardly from the periphery of the vehicle body 1, the air cushion has an effective plan area over which lift is applied to the vehicle, that is greater than the plan area of the underside of the vehicle body 1. It will also be understood that as the walls 4 and 5 and the webs 6 are flexible and the skirt projects laterally from the vehicle body 1, the skirt 2 forms a pneumatic fender protecting the peripheral part 1A of the vehicel body 1.

The skirt 2 may be retracted, i.e. lifted relative to the body 1, by shortening the jacks 11. A retracted position of the skirt 2 is illustrated by the dotted line positions in FIGURE 1 of the inner and outer walls, the boom and the jack which are respectively referenced 4', 5', 9' and 11'. The members 10 constrain the boom 9 to swing in an arc and as the jacks 11 are shortened the boom 9 must swing upwardly raising the bottom of the skirt 2 relative to the vehicle body 1. Since the bottom of the skirt 2 is tied to the lower edge of the peripheral part 1A of the vehicle body by the wall 4, the bottom of the skirt 2 rotates about this lower edge as the skirt rises and the bottom of the skirt moves clear of the vehicle body so that the vehicle can settle without crushing the skirt. The portion 5A of the wall 5 that was initially immediately above the boom 9 is maintained a constant distance from the boom 9 during retraction by means of cushion pressure tensioning the webs 6. The skirt 2 can, of course, be returned from its retracted to its lowered position, the bottom of the skirt again rotating about the lower edge just referred to by extending the jacks 11 to their initial position.

Conveniently the compartments of the skirt will be provided with drainage holes at or in the region of the point C and it may serve to improve the cushion to provide a small jet at that point. Alternatively nozzles (not shown) could be provided along the bottom of the skirt, the nozzles being arranged to be supplied with air from a compressor on the vehicle via a duct through the part 1A, the nozzles being arranged to form a downwardly and inwardly directed air curtain.

In a modification of the skirt construction of FIGURES 1 to 3 the inner wall 4 is omitted, and in this case it is the webs 6 that serve to tie the bottom of the skirt 2 to the lower edge of the peripheral part 1A of the vehicle body. However, it is desirable to provide the inner wall 4 at least along the rear side of the vehicle to prevent scooping of water by the outer wall 5.

Although the vehicle described with reference to FIGURES 1 to 3 is of the plenum chamber kind, it will be understood that a hollow flexible inflatable skirt like the skirt 2 and which is retractable and arranged for acting as a fender can also be applied to an air cushion vehicle having nozzles around the underside of the periphery of the vehicle body for directing an air jet downwardly around the whole of the periphery of the vehicle body. In this case the inner wall of the skirt would form an extension of the outer wall of the nozzle or nozzles, the lower portion of the wall being curved to direct the downward air flow in an inward direction.

The vehicle of FIGURES 4 to 6 also has a retractable inflatable skirt 2 attached to the peripheral part 1A of the vehicle body 1 for depending from the body to encircle the air cushion space 3 which is supplied with air from an air compressor (not shown) on the vehicle. The skirt 2 of FIGURE 4 has inner and outer walls 12, 13 made of thin flexible sheet material of rubber or similarly flexible material. The upper edge of the wall 12 is joined to the lower edge 14 of the part 1A while the upper edge of the wall 13 is joined to the part 1A at a distance $r$ below the upper edge 15 of this part 1A. The lower edges of the walls 12 and 13 are joined together at 16. Thus the wall 12 serves to tie the bottom of the skirt 2 to the lower edge 14 of the vehicle body part 1A. The distance between the upper and lower edges of the wall 12 is R. The outer wall 13 is of curved form in vertical section, the lower part which is that between locations indicated by the references 16 and 17 being of a radius R about the edge 14. The upper part of the wall 13, i.e. that between the location 17 and the upper edge of the wall 13, changes radius progressively from R at the location 17 to R–$r$ at the location where the wall joins the part 1A. The space 18 that is enclosed by the walls 12 and 13 is divided into compartments 19 by vertical webs 20 of flexible sheet material that are joined to the walls 12 and 13. The webs 20 may also be joined to the part 1A. The walls 12 and 13 are of corrugated form, the corrugations extending in the up and down direction, the fold lines of the corrugations of the wall 13 being joined to the fold lines of the corrugations of the wall 12 by the webs 20. Air supply pipes 21 are provided for delivering air to the compartments 19 at a pressure greater than the pressure of the air cushion in the space 3. Ducts 22 connect the compartments 19 to the space 3, there being a valve 24 in each such duct for controlling the flow of air therethrough.

In normal operation of the vehicle the valves 24 are closed, the air cushion in the space 3 supports the vehicle and the skirt 2 assumes the condition indicated in FIGURE 4 where it depends from the vehicle body 1 to enclose the cushion and also projects laterally from the vehicle body 1 to form a pneumatic fender. When it is desired to retract the skirt the pressure within the skirt 2 is allowed to fall to cushion pressure by opening the valves 24 to vent the compartments 19 into the cushion space 3 via the ducts 22. Buckling of the upper portion of the outer wall 13 takes place as indicated in FIGURE 6 and the skirt 2 rotates about the edge 14 under the action of cushion pressure acting on the wall 12. The bottom of the skirt moves clear of the vehicle body so that the vehicle can settle without crushing the skirt. By suitable operation of the valves 24 the pressure within the compartments 19 may be caused to assume a value intermediate between the pressure in the pipes 21 and that in the space 3 so that the skirt 2 adopts an attitude between the retracted position of FIGURE 6 and the fully depending position of FIGURE 4.

The skirt described above with reference to FIGURES 4 to 6 is suitable for plenum chamber vehicles. A skirt arrangement suitable for vehicles in which the air cushion is encircled by an air curtain is illustrated in FIGURE 7. In this arrangement the skirt 2 has a wall 26 composed of a plurality of side-by-side curved tubes 27 adjacent ones of which are secured together so that the skirt is imperforate. The upper ends of the tubes 27 are secured to the upper portion of the part 1A of the vehicle body 1. The upper end of each tube 27 communicates with a supply pipe 28 which is connected to a source of air at a pressure greater than that in the cushion 3. The space 29 between the wall 26 and the part 1A is divided into a plurality of compartments 30 by webs 31 which determine the curved shape of the tubes. The outside of the upper part of the wall 26 that lies between the upper ends of the tubes 27 and the location indicated by the reference 32 is of a radius R–$r$ about the bottom edge 33 of the part 1A. Below the location 32 the radius of the wall 26 progressively increases to the bottom of the wall where the outer radius of the wall about the edge 33 is R. The tubes 27 at the location 32 are fitted with non-return valves 34 which allow air to flow only in the direction towards the lower ends of the tubes 27 which are closed. Each compartment 30 communicates with an air supply duct 35 in the vehicle body 1. The ducts 35 are connected to the pipes 28 through valves 36.

In operation of the vehicle of FIGURE 7 the valves 36 are closed and the parts assume the position shown in the figure, air supplied by the pipes 28 inflating the tubes 27. Air supplied by the ducts 35 flows around the inside of the wall 26 through the compartments 30 and leaves the bottom of the wall 26 to form an air curtain 37 which sustains the cushion in the space 3. When it is desired to retract the skirt, air in the tubes 27 upstream of the valves 34 is allowed to escape to the cushion by opening the valves 36. It will be understod that air in the tubes 27 downstream of the valves 34 is prevented from escaping by the action of these valves. The skirt 2 swings upwardly, the upper portion of the wall 26 collapsing until the location 32 is adjacent the upper portion of the part 1A. The return of the skirt to the condition illustrated in FIGURE 7 is achieved by closing the valves 36 so that the upper portions of the tubes 27, i.e. the portions upstream of the valves 34, become reinflated.

The portions of the webs 31 that are within the collapsible sector between the location 32 and the part 1A may be replaced by a series of ties radiating from the edge 33 in order to avoid blockage of the outlets of the ducts 35 by blocked portions of the webs 31 when the skirt is in the retracted condition. In either case, however, it will be appreciated that the webs 31 or the ties serve to tie the bottom of the skirt 2 to the edge 33 so that the bottom of the skirt rotates about the edge 33 during raising and lowering of the skirt.

In a modification (not shown) of the vehicle of FIGURES 4 to 6 the pipes 21 can be enlarged to supply the whole of the air for the air cushion and for inflating the skirt 2, a nozzle being formed at the bottom of the skirt to direct a curtain of air downwards and inwards to form a cushion-sustaining air curtain. Retraction of such a skirt would be achieved by venting the skirt compartments into the air cushion or by reducing the pressure of the air supplied by the pipes 21. In the latter case the ducts 22 and valves 24 can be omitted.

It will be understood that in all the embodiments mentioned above as the skirt is retracted the effective plan area of the cushion increases.

I claim:
1. An air cushion vehicle including a vehicle body arranged for receiving support from an air cushion when formed in a space beneath the vehicle body, a flexible skirt attached to and depending from the vehicle body in a position to minimize leakage of air laterally from said space after the air cushion is formed, the skirt being of the hollow inflatable type and, when inflated, projects laterally from the periphery of the vehicle to form a fender; wherein the improvement comprises said skirt including a wall of flexible sheet material extending outwardly and then downwardly from at least one position of attachment to the vehicle gody when the skirt is inflated, the bottom of the wall, when the skirt is fully extended and lowered, terminating at a lowermost position which is below the vehicle body, a tension means connecting the bottom of said hollow skirt to the vehicle body at a second position of attachment below said first position of atachment whereby the bottom of the skirt rotates about the position of attachment of the tension means to the vehicle body when the skirt is raised or lowered, means for supplying air to said space for forming the air cushion, and means for effecting the retraction and lowering respectively of the skirt so that the bottom of the skirt is raised and lowered respectively relative to the vehicle body.

2. A vehicle according to claim 1, wherein said tension means is of flexible sheet material.

3. A vehicle according to claim 2, wherein the tension means are provided with an opening whereby the interior of said skirt may receive air from the air cushion for effecting the inflation of the skirt.

4. A vehicle as defined in claim 1, wherein said means for effecting the retraction and lowering of the skirt inculdes a boom extending along and spaced from the vehicle body, spaced members pivotally connected to the vehicle body and attaching the boom thereto, and adjustable boom-connecting means joined to the vehicle body at a level different from that of said members, the arrangement being such that by adjusting the length of said connecting means the boom can be adjusted to swing in an arc thereby to respectively raise and lower the skirt relative to the vehicle body.

5. A vehicle as claimed in claim 4, wherein said connecting means are of adjustable length and comprise jacks.

6. A vehicle as claimed in claim 1, wherein means are provided for supplying air at a pressure greater than air cushion pressure to the interior of the skirt, and wherein the means for effecting asid retraction and lowering includes a valve-controlled duct means interconnecting the interior of the skirt and the air cushion space.

7. A vehicle as defined in claim 6, wherein said tension means is attached at said second position of attachment to said bottom edge portion of the vehicle body thereby to tie the bottom of the wall to said bottom edge, and the upper edge of said wall being joined to the side of the vehicle body above said second position of attachment, and wherein the wall is of curved form in vertical section, the lower part of the wall being circular about the line where the tension means joins the vehicle body, and the upper part of the wall having a radius about said line that progressively decreases from the line joining the lower and upper parts of the wall.

8. A vehicle as claimed in claim 1, wherein the skirt is in the form of side-by-side joined-together tubes, the outer portions of which form said wall, there being duct means for delivering to the inside surface of the upper part of the skirt air which flows down the inside surface of the skirt and leaves the bottom edge of the skirt as an air curtain for sustaining the air cushion; wherein said means for effecting the retraction and lowering of the skirt include a non-return valve in each tube separating an upper portion of the tube from a lower portion thereof, and means for venting the upper portions of the tubes; and wherein the upper end of each upper tube portion is secured to the vehicle body and is arranged to receive air at a pressure greater than cushion pressure air, the non-return valves being arranged to permit flow of air therethrough in the direction from the upper portions to the lower tube portions but not in the reverse direction.

References Cited by the Examiner

UNITED STATES PATENTS 3,182,740   5/1965   Cockerell _____ 180—7

FOREIGN PATENTS 245,422   6/1963   Australia.

A. HARRY LEVY, *Primary Examiner.*

BENJAMIN HERSH, *Examiner.*

M. S. SALES, *Assistant Examiner.*